(12) United States Patent
DeHart (10) Patent No.: US 6,758,331 B2
(45) Date of Patent: Jul. 6, 2004

(54) PORTABLE TRUCK-WINDSHIELD CLEANING DEVICE

(76) Inventor: David M. DeHart, 10382-140th Ave., Foreston, MN (US) 56330

( * ) Notice: Subject to any disclaimer, the term of this patent is extended or adjusted under 35 U.S.C. 154(b) by 45 days.

(21) Appl. No.: 10/153,332

(22) Filed: May 21, 2002

(65) Prior Publication Data

US 2003/0229962 A1 Dec. 18, 2003

(51) Int. Cl.[7] .............................................. B65D 69/00
(52) U.S. Cl. .................................... 206/229; 206/209.1
(58) Field of Search ................................ 206/229, 335, 206/361, 362, 362.3, 15.2, 15.3, 362.1, 362.2, 209.1; 220/324, 326; 248/213.2; 224/402, 404, 405

(56) References Cited

U.S. PATENT DOCUMENTS

| | | | | |
|---|---|---|---|---|
| 2,809,766 A | * | 10/1957 | Anderson | .................... 220/324 |
| 3,207,296 A | * | 9/1965 | Goodall | ..................... 206/209 |
| 3,299,458 A | | 1/1967 | Royalty | |
| 3,791,875 A | * | 2/1974 | Koehler | ...................... 206/209 |
| 3,884,635 A | * | 5/1975 | Sloan | .......................... 206/209 |
| D235,410 S | | 6/1975 | Epstein | |
| 3,952,906 A | * | 4/1976 | Georgopulos | ............... 206/503 |
| 4,143,792 A | | 3/1979 | Rex | |
| 4,200,949 A | | 5/1980 | Heniff, Jr. | |
| D269,642 S | | 7/1983 | Sommers | |
| 4,915,219 A | * | 4/1990 | Ottimo | ..................... 206/209.1 |
| 5,546,628 A | * | 8/1996 | Silvera | ..................... 15/257.06 |
| 5,577,779 A | * | 11/1996 | Dangel | ........................ 229/80 |
| 5,960,513 A | | 10/1999 | Beshah | |
| 6,007,129 A | * | 12/1999 | Kearney, Jr. | ............... 296/37.6 |
| 6,036,388 A | | 3/2000 | Atcher | |
| 6,082,915 A | | 7/2000 | Kimmel | |
| 6,135,276 A | | 10/2000 | French et al. | |
| 6,269,969 B1 | * | 8/2001 | Huang et al. | ............... 220/835 |
| 6,348,235 B1 | * | 2/2002 | Cavill et al. | ................ 427/280 |
| 6,360,884 B1 | * | 3/2002 | Smith et al. | ............. 206/209.1 |
| 6,581,776 B2 | * | 6/2003 | Zatkoff | ....................... 206/576 |

* cited by examiner

Primary Examiner—Shian T. Luong
(74) Attorney, Agent, or Firm—Patterson, Thuente Skaar & Christensen, P.A.

(57) ABSTRACT

A convenience-providing truck-windshield cleaning device comprised of a squeegee and a container having interior dimensions only slightly larger than the squeegee for containing a supply of windshield-washing liquid in the lower portions thereof, and a cover for sealing off the interior with the squeegee therewithin, the squeegee having a handle slightly shorter than the depth of the interior of the container to enable same to be completely enclosed within the chamber with the cover of the chamber closed, yet being of sufficient length to enable the truck driver to reach the midsection of the truck's windshield, for cleaning same while standing beside the truck opposite an end of the windshield.

6 Claims, 7 Drawing Sheets

PORTABLE TRUCK-WINDSHIELD CLEANING DEVICE

BACKGROUND OF THE INVENTION

This invention relates to truck-driving. More particularly, it relates to a single and inexpensive means for solving or minimizing a serious problem of evening driving by professional, long-range truck drivers, and the like.

As compared to automobile driving, long-range truck-driving presents an arduous and strenuous task. It is characterized by long hours and distances, lack of adequate sleep, trying road conditions, and especially and frequently, inadequate visibility conditions caused by the windshield of the truck becoming littered, especially during night driving, with flying insects which accumulate rapidly and frequently. When this occurs, the driver properly feels compelled to pull over to the side of the highway to manually clear the windshield of the collected mass of insects, and to clean the same in order to obtain clear vision. At times, the necessity for such stops are frequent, especially in the mid-summer evenings. Because of their frequency, it becomes extremely difficult, and at times impossible for the driver to adhere to his schedule.

In addition to the above, truck drivers are required to make regular pre-determined stops which consume a substantial portion of their travel time. For all of the above reasons, there is a substantial need for some means for enabling truck drivers to clean the windshields of their trucks quickly and frequently in order to obviate the dangers inherent in the problems described. As a professional truck driver, I am deeply aware of this problem, of the dangers caused thereby and of the need for a simple and inexpensive solution thereof.

I have found that the practice of pulling our truck-loads into service stations and the like to rid ourselves of the above problems is inadequate because of the inadequacy of space, the lack of an adequate supply of 24-hour service, the problems of traffic, the presence of prior customers and the delays they cause, etc.

On the other hand, my experience has been that there are frequent locations along any trip at which it is convenient to pull over off the main road, for whatever reason the driver may have. At such locations there is no appreciable loss of time; only that required to remedy the problem at hand is needed. Also, there are no appreciable time delays, because of traffic, in getting back onto the road.

There is a marked scarcity of longitudinal space along the exterior of almost all trucks. I have compensated for this disadvantage by the manner in which I have designed my container and oriented same on the side surface of the truck.

I have concluded that we are compelled to solve our above problems ourselves at a self-selected location and time. As a consequence, I have conceived of a device which I have found is simple, inexpensive, and provides an adequate solution.

BRIEF SUMMARY OF THE INVENTION

My invention is designed to be of the utmost convenience, and efficiency for the truck driver in effectively cleaning the truck-windshield in a minimum of time expenditure. It is comprised of a simple rectangular self-contained closed container produced preferably of light non-rusting metal such as aluminum, and having minimum dimensions suitable for receiving, storing, providing ready accessibility, and maintaining a level of windshield cleaning fluid and a squeegee having a handle, all therewithin. It is designed to have one narrow dimension so that it can be mounted on the exterior surface of the truck at a location handy to the driver as he exits from his driver's seat, while utilizing only a minimum of the longitudinal exterior surface of the truck. The handle of the squeegee is shorter than the depth of the container so the cover seals the squeegee and handle within the compass of the closed container during travel. The vertical depth of the container is about eighteen (18) inches so that the cover can be closed with the squeegee and its handle stored therewithin, and if the cover is unintentionally left open or removed, no appreciable amount of the windshield cleaning fluid will splatter outside the container. The transverse dimension of the squeegee is about four (4) inches or less and the transverse dimension of the container at its narrower dimension is only slightly more than that of the squeegee.

DETAILED DESCRIPTION OF THE INVENTION

As shown in FIGS. 1–6, inclusive, the invention includes a chamber 10 made preferably of a non-rusting metal, such as aluminum and having a relatively wide front side panel 11 and backside panel 12. As shown, the chamber has relatively narrow end panels, 13 and 14 respectively which cooperatively define a rectangular configuration. A bottom wall or floor 15 and a hinged cover member 16 complete the wall structure of the container which is designed to contain window-cleaning liquids.

Figures 2, 3:
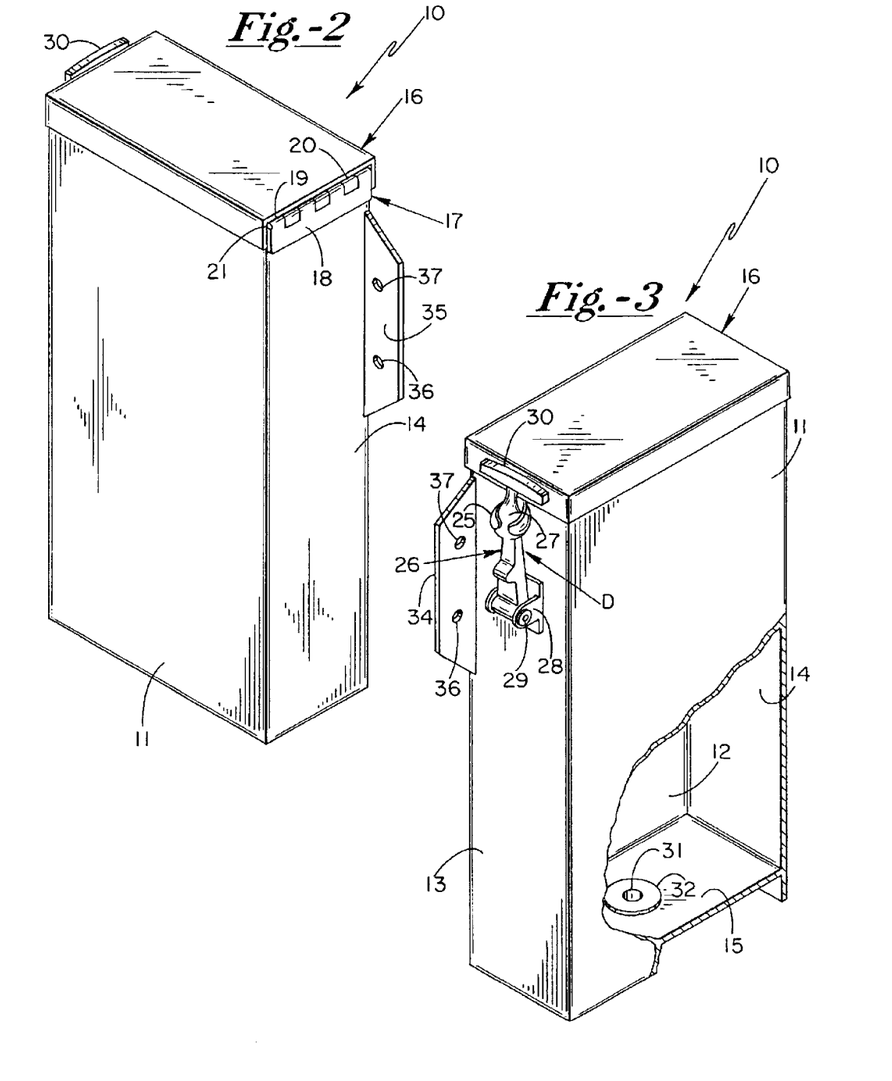
FIG. 2 is a perspective view of an embodiment of my invention, taken from the front and to the right of the container.
FIG. 3 is a perspective view of the embodiment shown in FIG. 2, taken from the front and to the left of the container.
Figure 4:
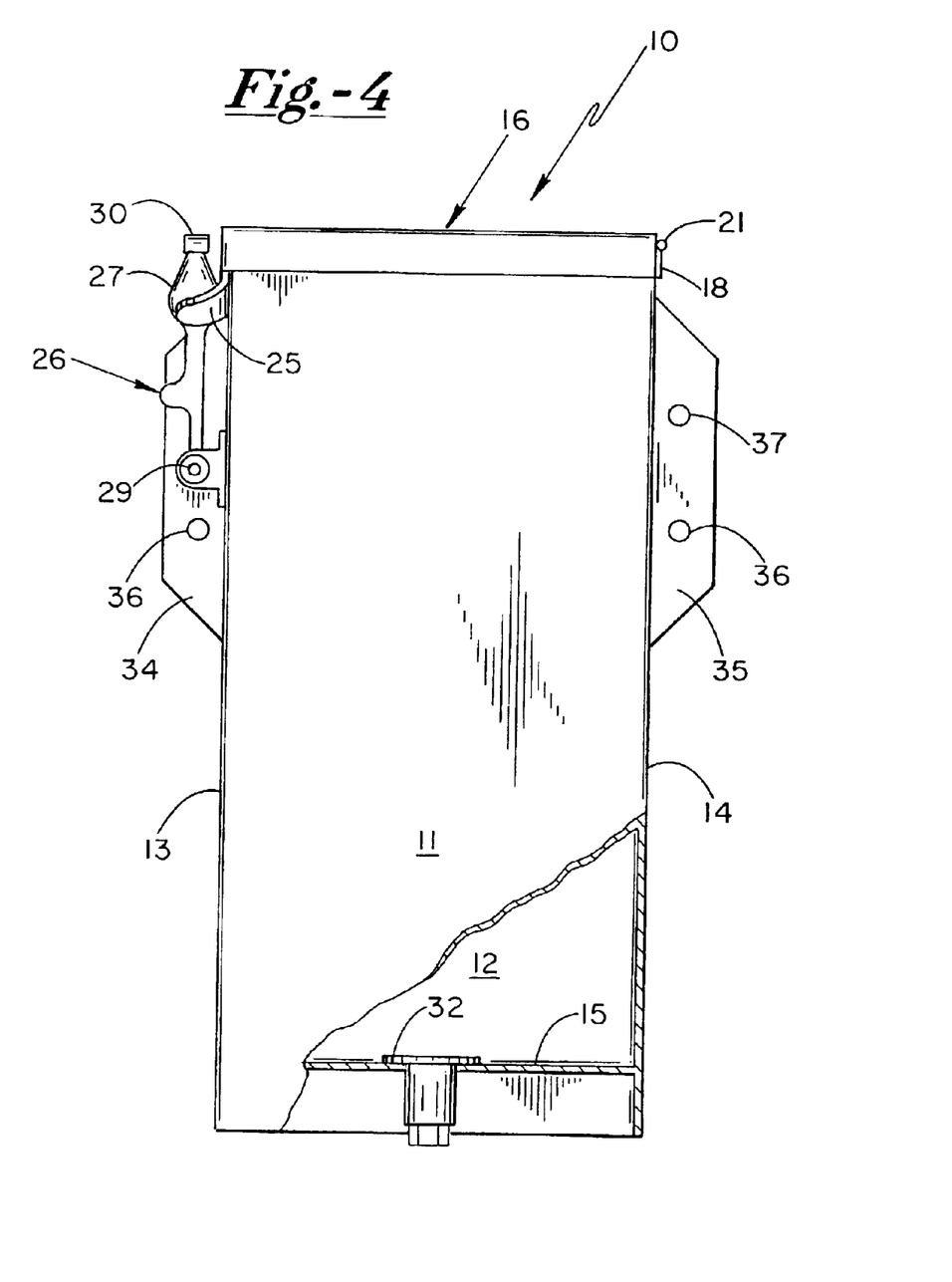
FIG. 4 is a side elevational view of an embodiment of my invention without the squeegee and with a portion of the front wall broken away and shown in vertical section.

The cover member 16 is hingedly mounted upon the upper end the end of panel 14, as best shown in FIGS. 2 and 4. The hinge 17 is comprised of an elongated mounting panel 18 having upstanding sleeves 19 alternately positioned between cooperating sleeves 20 carried by cover 16 in the conventional manner in which a pin 21 extends through each of the sleeves, as best shown in FIG. 2. A floor member 15 completes the enclosure of the chamber 10.

Figure 6:
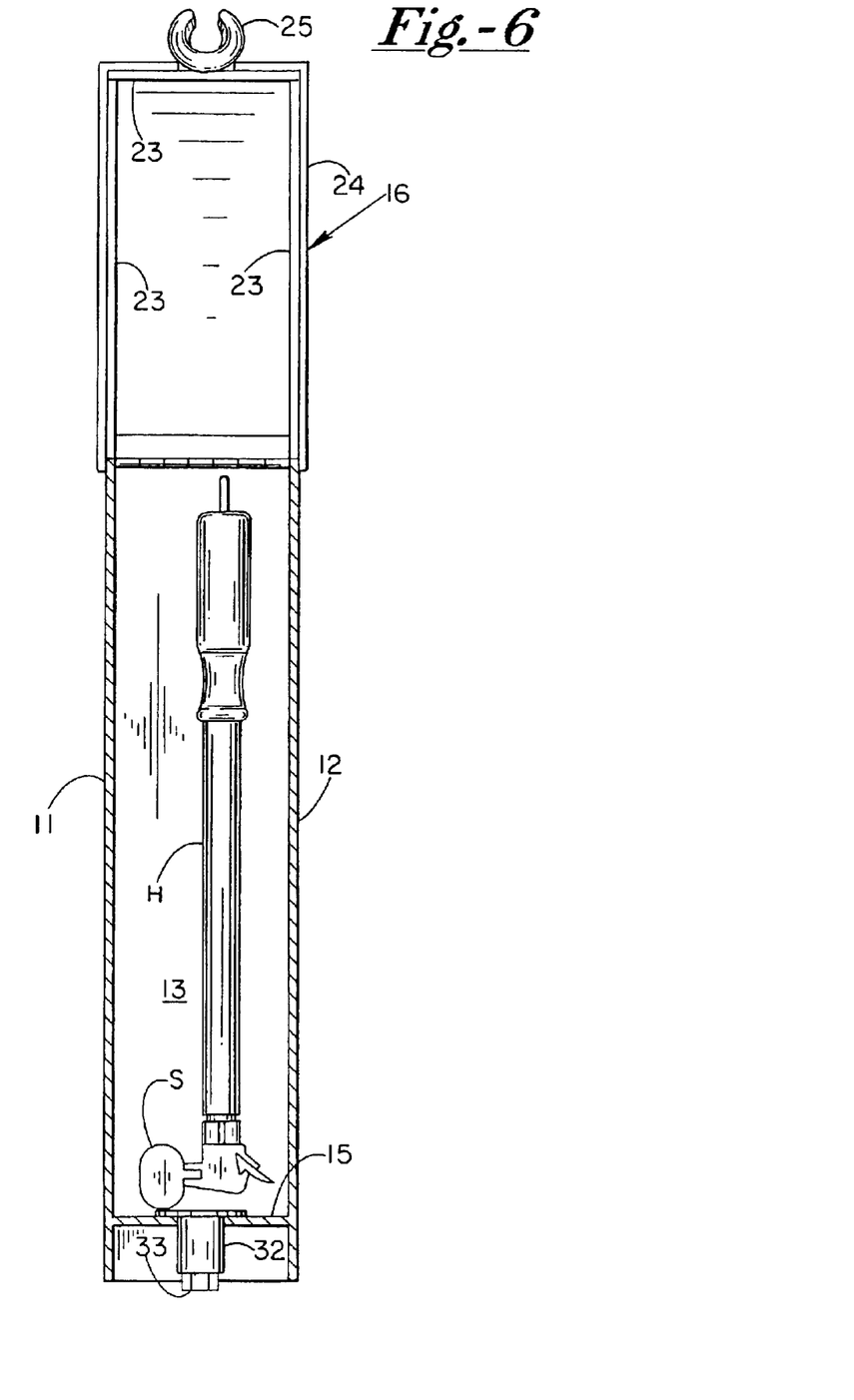
FIG. 6 is a vertical sectional view taken immediately inside the left side wall of the embodiment shown in FIG. 5 and looking to the right thereof.

The cover member 16 includes a rubber liner 23 which extends around three (3) sides of the interior of the cover, as best shown in FIG. 6. The rubber liner 23 extends along the inner surface of the depending lip 24 of the cover, as shown.

The cover 16 also includes a catch 25 which as best shown in FIG. 6, is a split socket designed to receive and retain latch member 26 in extended locking position when its ball element 27 is received therein. Latch member 26 is hingedly mounted on end wall 13 by means of a mounting panel 28 which swingably mounts elastic latch 26 by a pin 24, which extends through the lower end of latch 26, as best shown in FIG. 3. Handle member 30 facilitates stretching of latch member 26 sufficiently to enable the driver to stretch the area immediately below ball element 27 sufficiently to enable it to pass through the slot in the split socket of catch 25, prior to release of tension at the handle 30. Upon release of tension at the handle, the ball element 27 settles into catch member 25 to effectively retain cover 16 in confining (closed) position, as shown in FIG. 3. Thus, the latch element 26 and catch member 25 together constitute a detent D.

Figure 5:
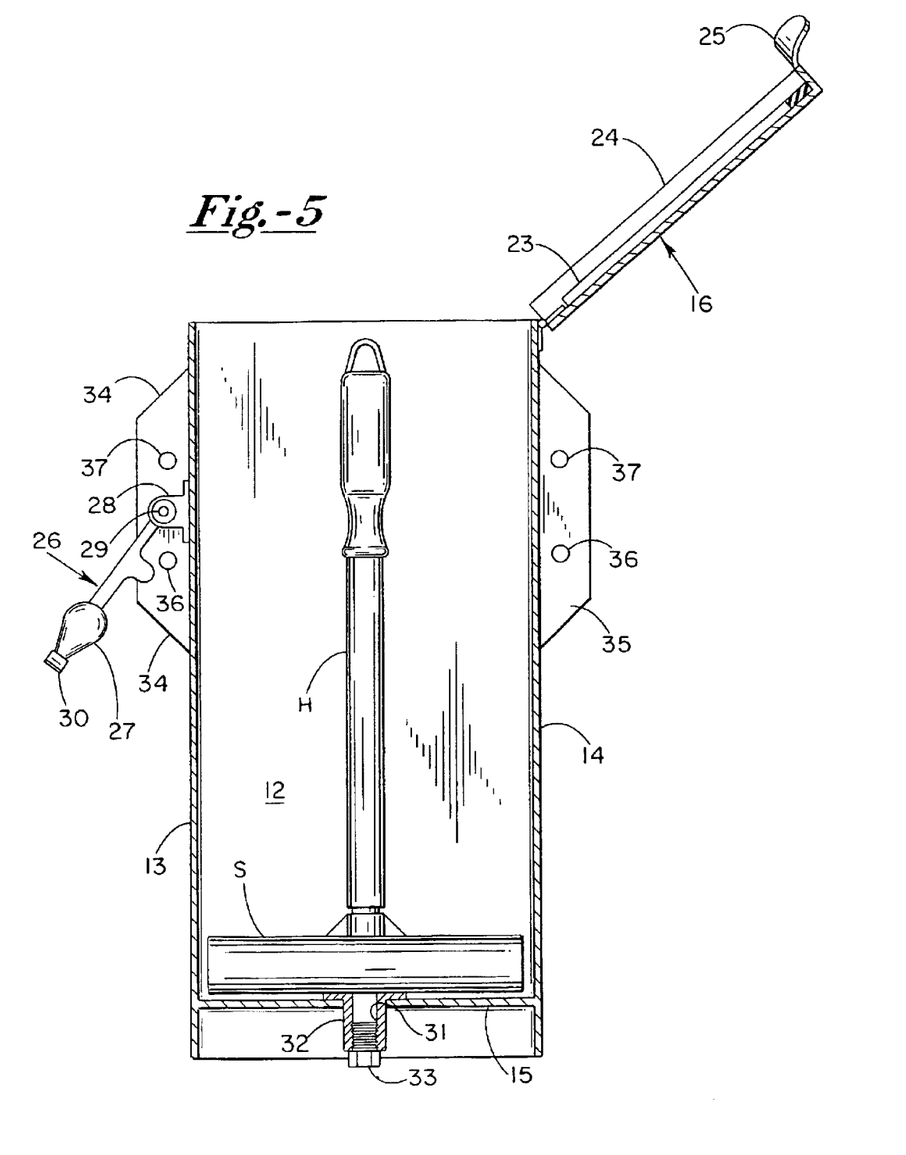
FIG. 5 is a vertical sectional view of the embodiment of the container shown in FIG. 4, with the cover open and the squeegee shown, taken immediately inside the front wall.

Floor member 15 has a drain opening 31 through which a drain tube 32 extends. The lower end of this drain tube is internally threaded to receive and retain a threaded plug 33, as best shown in FIG. 5.

Figure 1:
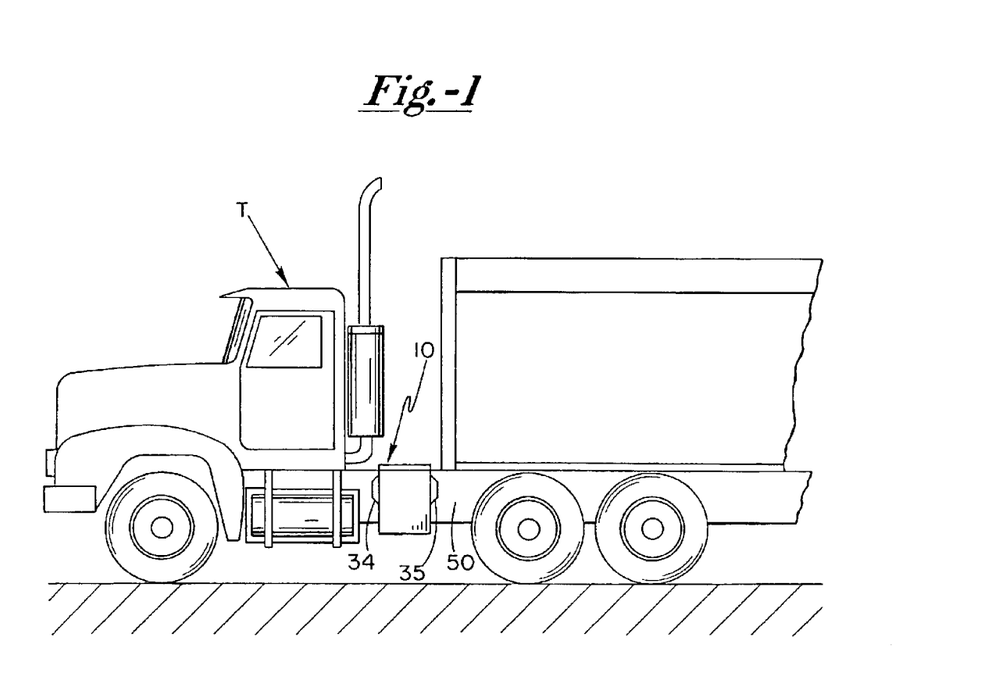
FIG. 1 is a side elevational view of a truck with an embodiment of my invention mounted on the side rail of the truck immediately behind the cab of that truck.

The chamber 10 is shown in FIG. 1, mounted upon the side rail of a truck T. As shown therein the chamber is mounted thereon by means of a pair of mounting flanges 34 and 35 which are carried by the chamber 10 at the upper end of the opposite side edges of rear panel 12. Each of the mounting flanges have openings such as 36 and 37 by means of which bolts (not shown) are accommodated to secure the flanges to the truck side rail, with the back wall 12 parallel to the longitudinal axis of the truck and flush against the side rail 50.

Figure 7:
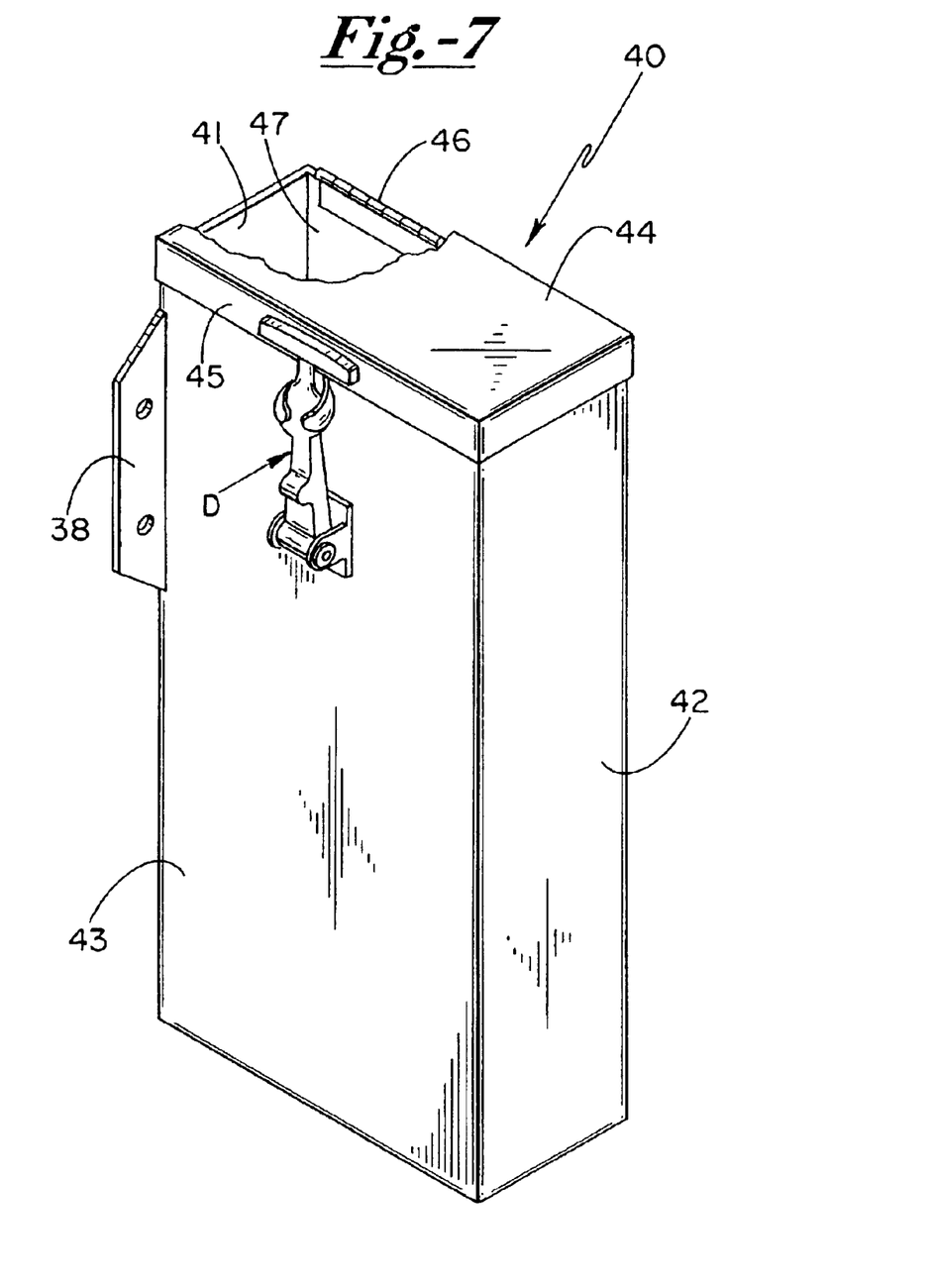
FIG. 7 is a perspective view of a second embodiment of my invention in which the mounting brackets are secured to the container at opposite sides of one of the narrow end walls and the latch element is secured to one of the wide side walls.

FIG. 7 discloses a second embodiment of my invention which varies from the above described first embodiment shown in FIGS. 1–6, inclusive in that its mounting flanges 38 and 39 (not shown), which are identical in construction to the mounting flanges 34 and 35, differ in that they are secured to the upper end of the chamber 40 at opposite sides of narrow panel 41 and extend outwardly therefrom. If desired the flanges 38 and 39 may be a part of the narrow panel 41 when the latter is formed. As shown, each of the flanges 38 and 39 (not shown), are means by which the flanges and chamber may be mounted upon the side rail 50 of truck T in the same manner as that described above with respect to FIGS. 1–6.

The chamber 40 is similar to chamber 10 but differs therefrom in that its mounting flanges 38 and 39 extend outwardly from and parallel to one of its narrow wall panels (41) instead of from one of the relatively wide side panels, and consequently the narrow panels 41 and 42 extend parallel to the longitudinal axis and side rail 50 of the truck, instead of normal thereto, as in FIGS. 1–6, inclusive.

In addition to the above the detent, which is identical in construction to detent D, is carried by the wide side panel 43 and the cover member 44. Cover member 44 is constructed similarly to cover member 16, except that its catch member is carried at the wider side 45 of the cover 44 and its similar hinged connection 46 to the side wall 47 is similar in construction to hinge 17. As a consequence of the above, the horizontal length of the entire assembly shown in FIG. 7, when mounted on the truck's side rail 50, extends normal to the side rail, with its narrow panels 41 and 42 parallel to the longitudinal axis of truck T. Thus, a minimum of space along the side rail 50 is utilized and the balance of the valuable space is available for mounting other needed equipment, such as tool boxes, etc.

Figure 8:
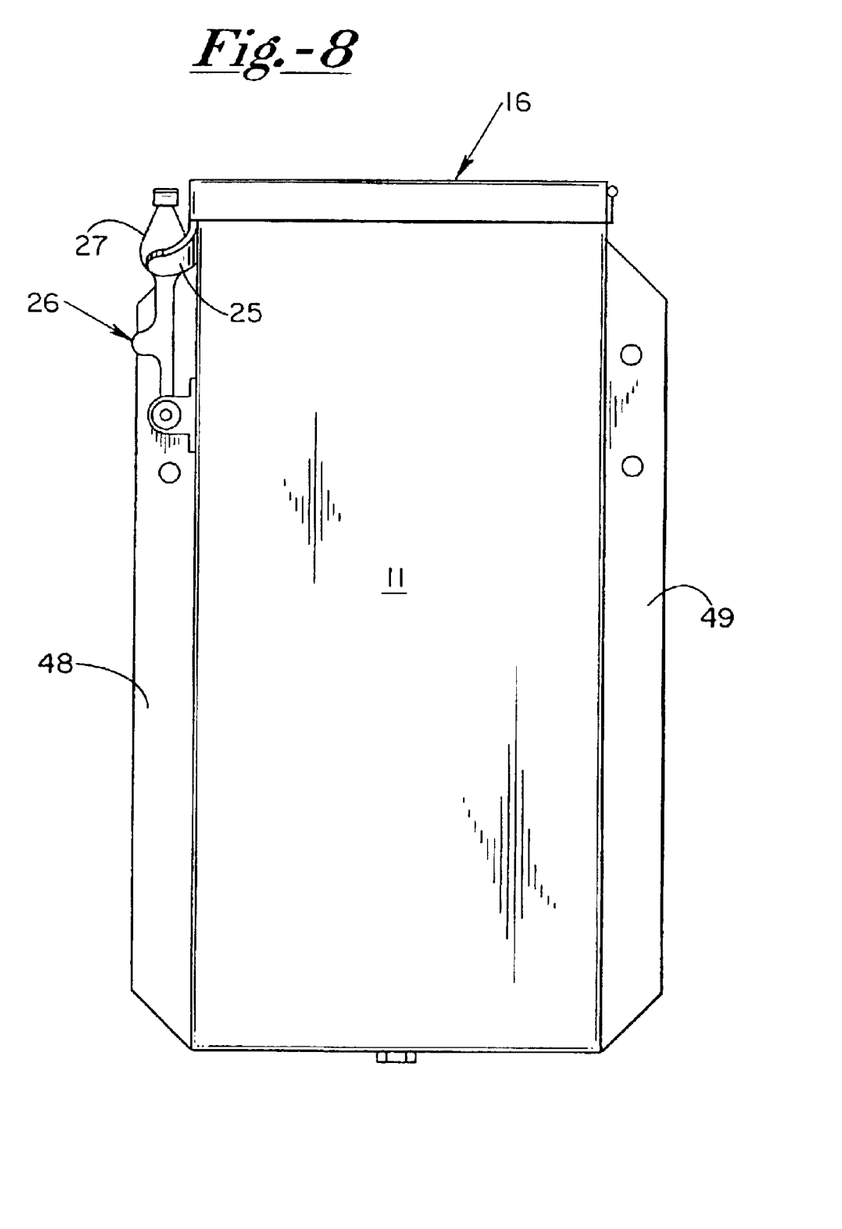
FIG. 8 is a front elevational view of a third embodiment in which the mounting plates are secured to opposite sides of the wider panel and extend vertically throughout substantially the entire vertical dimension of the chamber.

FIG. 8 shows a third embodiment of my invention which varies only from that shown in FIGS. 1–6, inclusive, in that the two mounting flanges extend vertically throughout the vertical length of the rear panel. Where the corresponding parts are identical, they have been identified in FIGS. 7 and 8 by the same means of identification as shown in FIGS. 1–6. The corresponding mounting plates which are mounted on back wall 12 and constitute the only difference, have been given numerals 48 and 49. It is believed that the use of the different mounting plates 48 and 49 may simplify manufacturing procedures.

The depth of each of the above chambers is such as to provide that the cover member may be held in closed position by the associated detent, with the squeegee handle H disposed entirely therewithin. Their depth is sufficient to preclude the windshield-washing fluid, covering the squeegee S, from splattering out of the chamber while going over rough roads, in the event that the chamber is inadvertently left uncovered. The depth of the chambers is approximately 18 inches. The most narrow dimension of the squeegee is about four (4) inches thick and the most narrow horizontal dimension of the chamber is slightly more that four (4) inches. The widest interior horizontal dimension of the chamber is slightly more than the width of the squeegee.

My above truck-windshield cleaning device provides a number of advantages over previously know windshield cleaners. Most importantly, substantial convenience at a minimum expense is provided. The cover is effective and desirable in precluding freezing of the cleaning fluid and in preventing the entrance of contaminants such as dirt, insects, etc. into the windshield-cleaning fluid. The availability of the squeegee S at all times is important to the truck driver because of its convenience, which is a time-saving consideration. The selection of a handle length which enables the driver to reach the windshield mid-center, yet provides its instant availability, while providing protection against insects, dirt and other contaminants entering the cleaning fluid, has proved to be a desirable attribute which is greatly appreciated by professional drivers. In addition, I have found that these chambers preclude loss of fluid when traveling over rough roads, in the event the driver inadvertently fails to close the cover of the chamber.

It will, of course, be understood that various changes may be made in the form, details, arrangement and proportions of the parts without departing from the scope of the invention which comprises the matter shown and described herein and set forth in the appended claims.

What is claimed is:

1. A truck-windshield cleaning device comprising:
   a) a container for containing a windshield-washing fluid, said container having an elongated transverse horizontal dimension, a relatively narrow horizontal transverse dimension and a vertical interior dimension;
   b) a squeegee having an elongated dimension and a relatively narrow transverse dimension thereby adapted to be contained within said container in immersed position within windshield-washing fluid when such fluid is contained within said container;
   c) a handle member supporting said squeegee, said handle member and said squeegee being confinable in their entireties within the confines of said container in all positions thereof therewithin;
   d) a cover member hingedly mounted on an upper end of said container in position to enclose the interior thereof while said squeegee and said handle are disposed therewithin;

e) a detent assembly comprised of a hinged latch member and a catch member, the hinted member attached to, said container and adapted to hold said cover member in a closed position via the catch member, at least one of said hinged latch and catch members having a resilient latching surface, wherein the hinged latch member includes an integral handle member distally located from the hinge and an integral ball element located intermediate the handle member and the hinge, said latch member being partially resilient, and wherein the catch member is adapted to receive the ball element of the latch member in extended locking position when the ball element is received in the catch member, said handle member facilitating stretching of the latch member portion intermediate said ball element and said hinge and allowing passage of portion of the latch member through the catch member;

f) a drain tube and a drain plug operably located in the bottom of said container; and g) cooperation mounting means attached to said container adapted for mounting said container to a surface.

2. The truck-windshield cleaning device defined in claim 1, wherein said narrow horizontal transverse dimension of said container is defined by a pair of opposed narrow vertical side wall panels having narrow transverse horizontal dimensions only slightly wider than the than the transverse dimension of said squeegee.

3. The truck-windshield cleaning device defined in claim 1, wherein said narrow horizontal dimension of said container is defined by a pair of narrow opposed vertical side wall panels having narrow transverse horizontal dimensions wider than the narrow transverse dimension of said squeegee, mid cooperative mounting means adapted for securing said narrow vertical side wall panels along and against a surface.

4. The truck-windshield cleaning device defined in claim 1, wherein said container has an internal depth of no less than eighteen (18) inches.

5. A truck-windshield cleaning device comprising:

a) a container for windshield washing fluids, said container having a vertical interior dimension;

b) a squeegee contained within said container, c) a handle member supporting said squeegee;

d) said handle member and said squeegee being confinable within the confines of said container in all positions thereof therewithin;

e) mounting means adapted for mounting said container upon a surface;

f) said handle member being elongated and extending substantially the vertical interior of the container;

g) a cover member hingedly mounted on an upper end of said container in position to enclose the interior thereof while said squeegee and said handle are disposed therewith; and h) a detent carried by said container and said cover and including a hinged latch element and a cooperating catch element, wherein at least one of said elements having a resilient latching surface, wherein at least one of said hinged latch member includes an integral handle member distally located from the hinge and an integral ball element located intermediate the handle member and the hinge, said latch member being partially resilient, and wherein the catch member is adapted to receive the ball element of the latch member in extended locking position when the ball element is received in the catch member, said handle member facilitating stretching of the latch member portion intermediate said ball element and said hinge and allowing passage of portion of the latch member through the catch member.

6. The truck-windshield cleaning device defined in claim 5, wherein said container has an internal vertical depth of no less than 18 inches.

* * * * *